(12) United States Patent
Katano

(10) Patent No.: US 8,602,664 B2
(45) Date of Patent: Dec. 10, 2013

(54) LENS BARREL AND IMAGE PICKUP APPARATUS

(75) Inventor: Kenichi Katano, Kawasaki (JP)

(73) Assignee: Canon Kabushiki Kaisha (JP)

( * ) Notice: Subject to any disclaimer, the term of this patent is extended or adjusted under 35 U.S.C. 154(b) by 54 days.

(21) Appl. No.: 13/330,740

(22) Filed: Dec. 20, 2011

(65) Prior Publication Data

US 2012/0155851 A1  Jun. 21, 2012

(30) Foreign Application Priority Data

Dec. 21, 2010  (JP) ................................. 2010-284794

(51) Int. Cl.
*G03B 9/02* (2006.01)

(52) U.S. Cl.
USPC ........................................... 396/505; 396/510

(58) Field of Classification Search
USPC .......................... 396/508, 505–507, 509, 510
See application file for complete search history.

(56) References Cited

FOREIGN PATENT DOCUMENTS

JP  09-211534 A  8/1997

OTHER PUBLICATIONS

Translation of 09-211534.*

* cited by examiner

*Primary Examiner* — Rochelle-Ann J Blackman
(74) *Attorney, Agent, or Firm* — Rossi, Kimms & McDowell LLP

(57) ABSTRACT

A lens barrel that is capable of reducing a size and cost by omitting an actuator only for diaphragm blades, and of preventing a change of a diaphragm aperture due to a variation in a part accuracy of a mechanism that drives diaphragm blades. Diaphragm blades have cam engagement parts, respectively. A holding member holds the diaphragm blades so as to be rotatable in directions to open and close an aperture. An energizing member energizes the diaphragm blades in a direction to open or close the aperture. A moving member has cam surfaces that engage with the cam engagement parts, and moves in an optical axis direction to operate the diaphragm blades by cam actions between the cam engagement parts and the cam surfaces against energizing force of the energizing member. Regulation parts regulate the operations of the diaphragm blades by the energizing force of the energizing member.

7 Claims, 14 Drawing Sheets

LENS BARREL AND IMAGE PICKUP APPARATUS

BACKGROUND OF THE INVENTION

1. Field of the Invention

The present invention relates to a lens barrel that has a diaphragm blade and changes a diaphragm aperture in connection with a zoom operation, and an image pickup apparatus like a digital camera provided with the lens barrel.

2. Description of the Related Art

A conventional image pickup apparatus (a digital camera, etc.) has a lens barrel that is provided with an exclusive actuator and a member linked to diaphragm blades as a driving mechanism for the diaphragm blades, and that changes a diaphragm aperture by operating the actuator to open and close the diaphragm blades.

However, when the actuator only for the diaphragm blades is provided, a space for mounting the actuator is necessary around the blades in the lens barrel, which enlarges a size of not only the lens barrel but also a camera, and increases a cost.

Japanese Laid-Open Patent Publication (Kokai) No. H9-211534 (JP H9-211534A) discloses a technique that a cam part (a grooved cam etc.) is provided in a lens barrel that moves in an optical axis direction so that a movement of the lens barrel in the optical axis direction operates a lever member through the cam part and the lever member drives the diaphragm blades linked with the lever member.

Although the technique of the JP H9-211534A does not need the actuator only for the diaphragm blades, a variation in a part accuracy may cause backlash between the lever member and the cam part and between the diaphragm blades and the lever member, which possibly changes the diaphragm aperture.

SUMMARY OF THE INVENTION

The present invention provides a mechanism that is capable of reducing a size and cost of not only a lens barrel but also an image pickup apparatus by omitting an actuator only for diaphragm blades, and of preventing a change of a diaphragm aperture due to a variation in a part accuracy of a mechanism that drives diaphragm blades.

Accordingly, a first aspect of the present invention provides a lens barrel comprising diaphragm blades each of which has a cam engagement part, a holding member that holds the diaphragm blades so as to be rotatable in directions to open and close an aperture, an energizing member that energizes the diaphragm blades in one of a direction to open the aperture and a direction to close the aperture, a moving member that has cam surfaces that engage with the cam engagement parts of the diaphragm blades, and that moves in an optical axis direction to operate the diaphragm blades by cam actions between the cam engagement parts and the cam surfaces against energizing force of the energizing member, and regulation parts that regulate the operations of the diaphragm blades in one of the direction to open the aperture and the direction to close the aperture by the energizing force of the energizing member.

Accordingly, a second aspect of the present invention provides an image pickup apparatus having the lens barrel of a zoom type according to the first aspect that moves in an optical axis direction among a collapsed position, a wide end, and a tele end to change magnification.

According to the present invention, a size and cost of not only a lens barrel but also an image pickup apparatus can be reduced by omitting an actuator only for diaphragm blades, and a change of a diaphragm aperture due to a variation in a part accuracy of a mechanism that drives diaphragm blades can be prevented.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
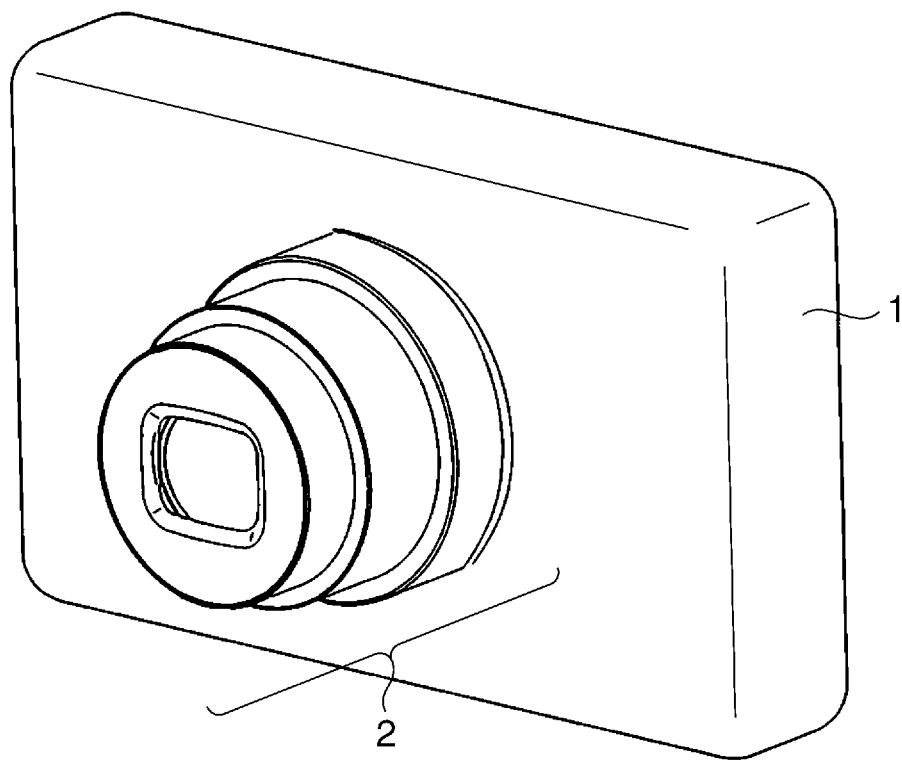
FIG. 1 is an outside perspective view showing a digital camera of an embodiment of an imaging apparatus according to the present invention when viewed from front.

FIG. 1 is an outside perspective view showing a digital camera of an embodiment of an imaging apparatus according to the present invention when viewed from front.

As shown in FIG. 1, the digital camera of this embodiment has a camera body 1 and a lens barrel 2 that is arranged in the front side of the camera body 1. The lens barrel 2 is a zoom lens type that changes magnification by moving a plurality of lens groups in an optical axis direction among a collapsed position, a stop position at a wide end, and a stop position at a tele end.

Figure 2:
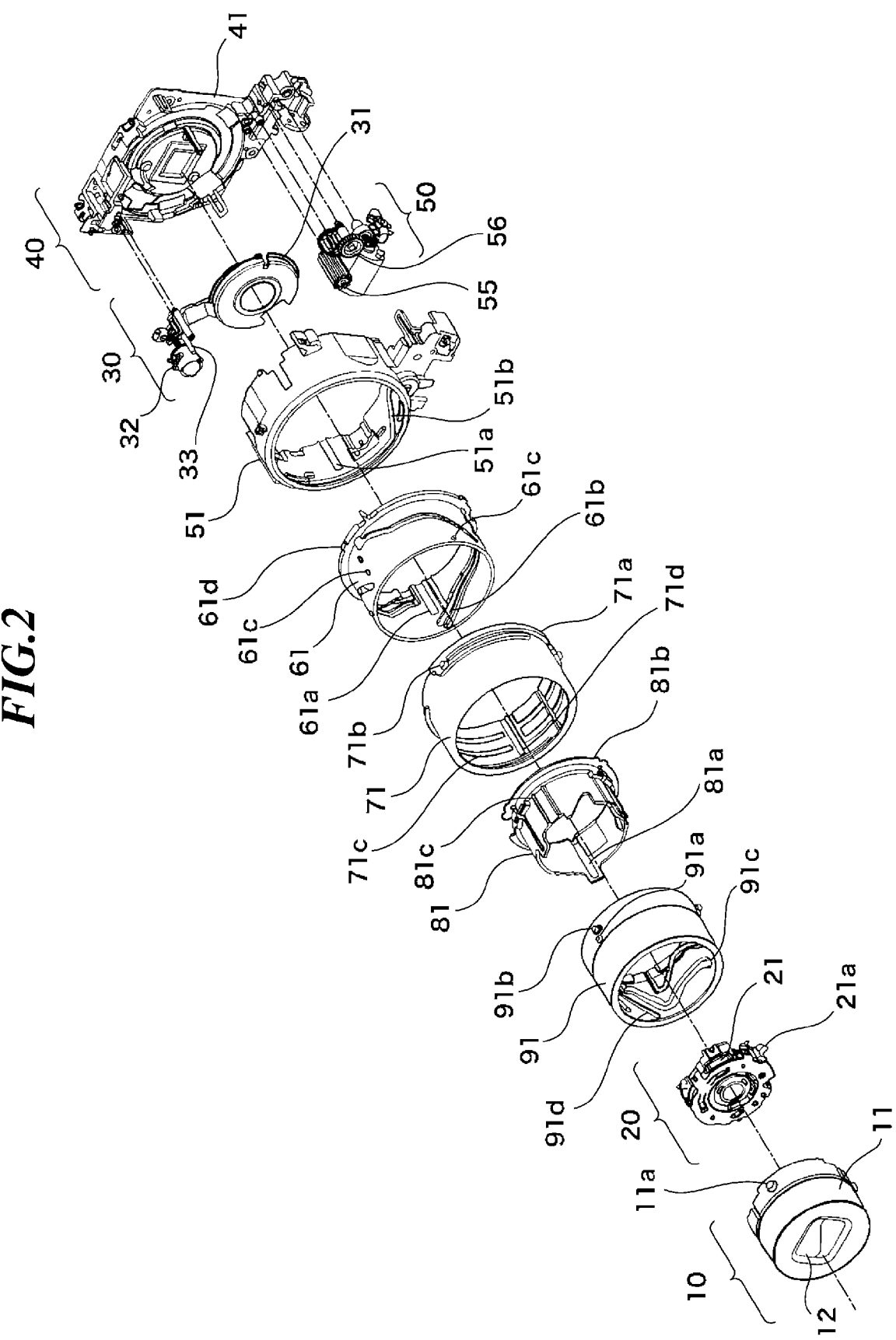
FIG. 2 is an exploded perspective view showing a lens barrel that constitutes the digital camera shown in FIG. 1.
Figure 3:
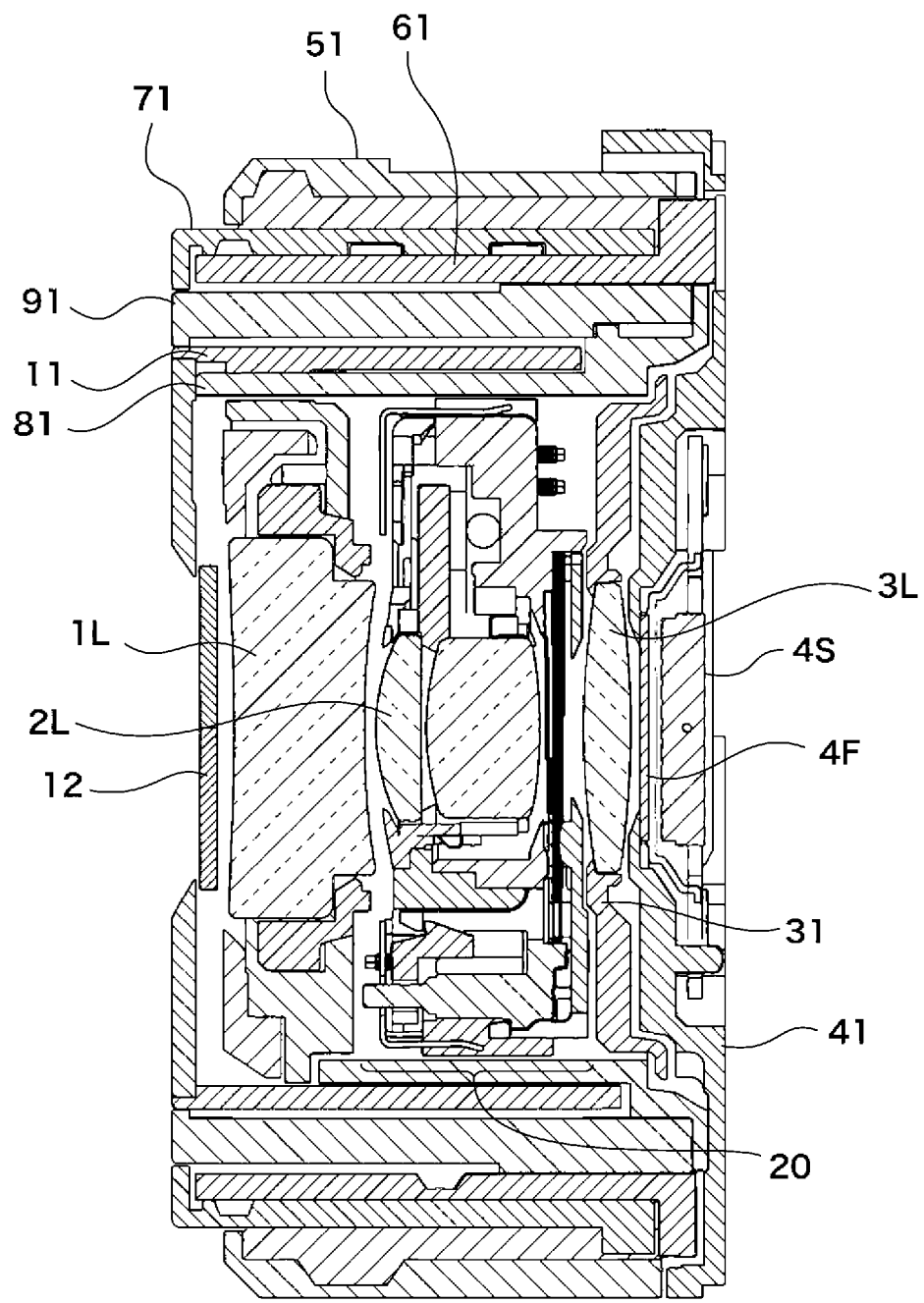
FIG. 3 is a sectional view showing the lens barrel in FIG. 2 in a collapsed position.
Figure 4:
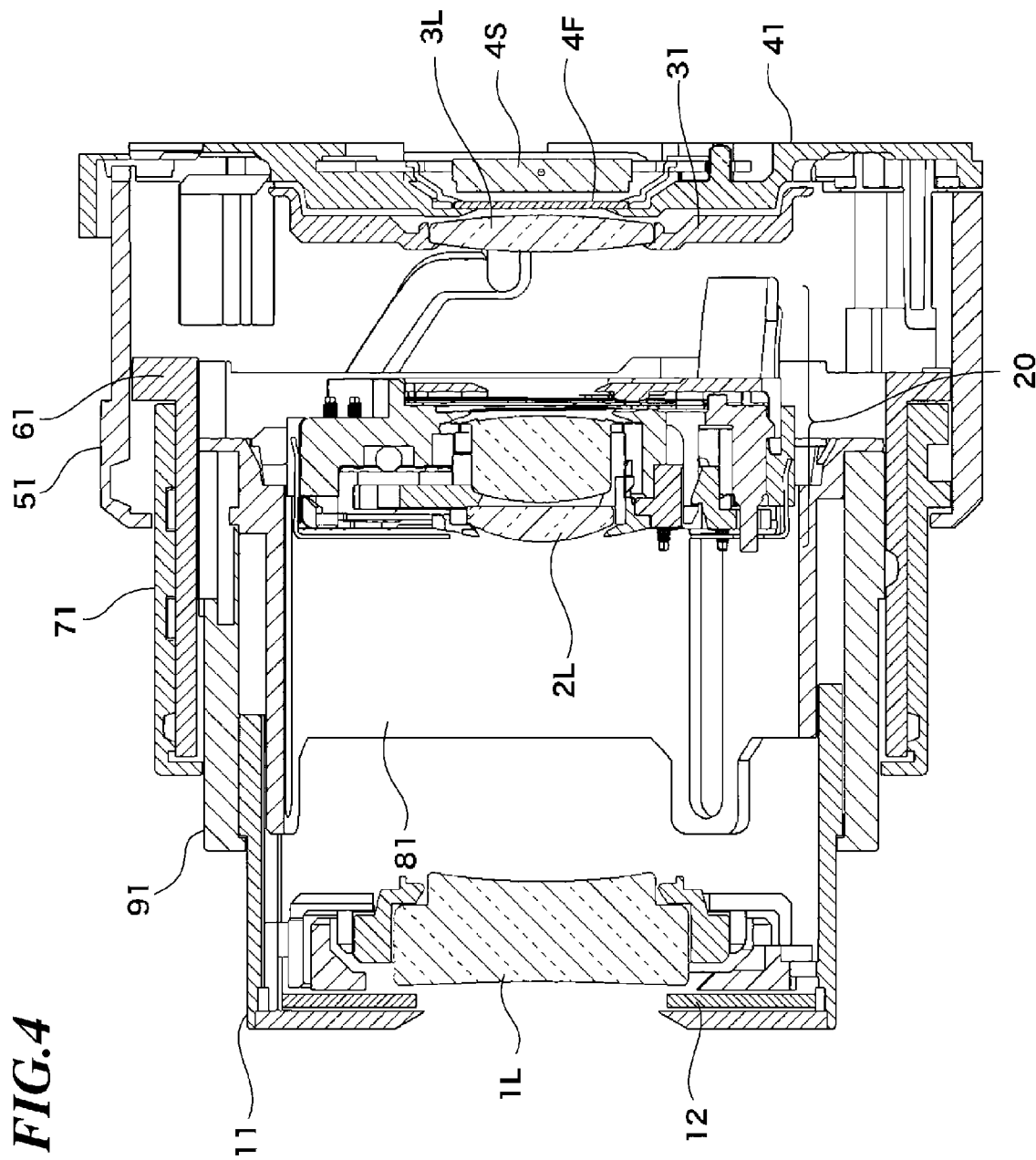
FIG. 4 is a sectional view showing the lens barrel in FIG. 2 in a stop position at a wide end.
Figure 5:
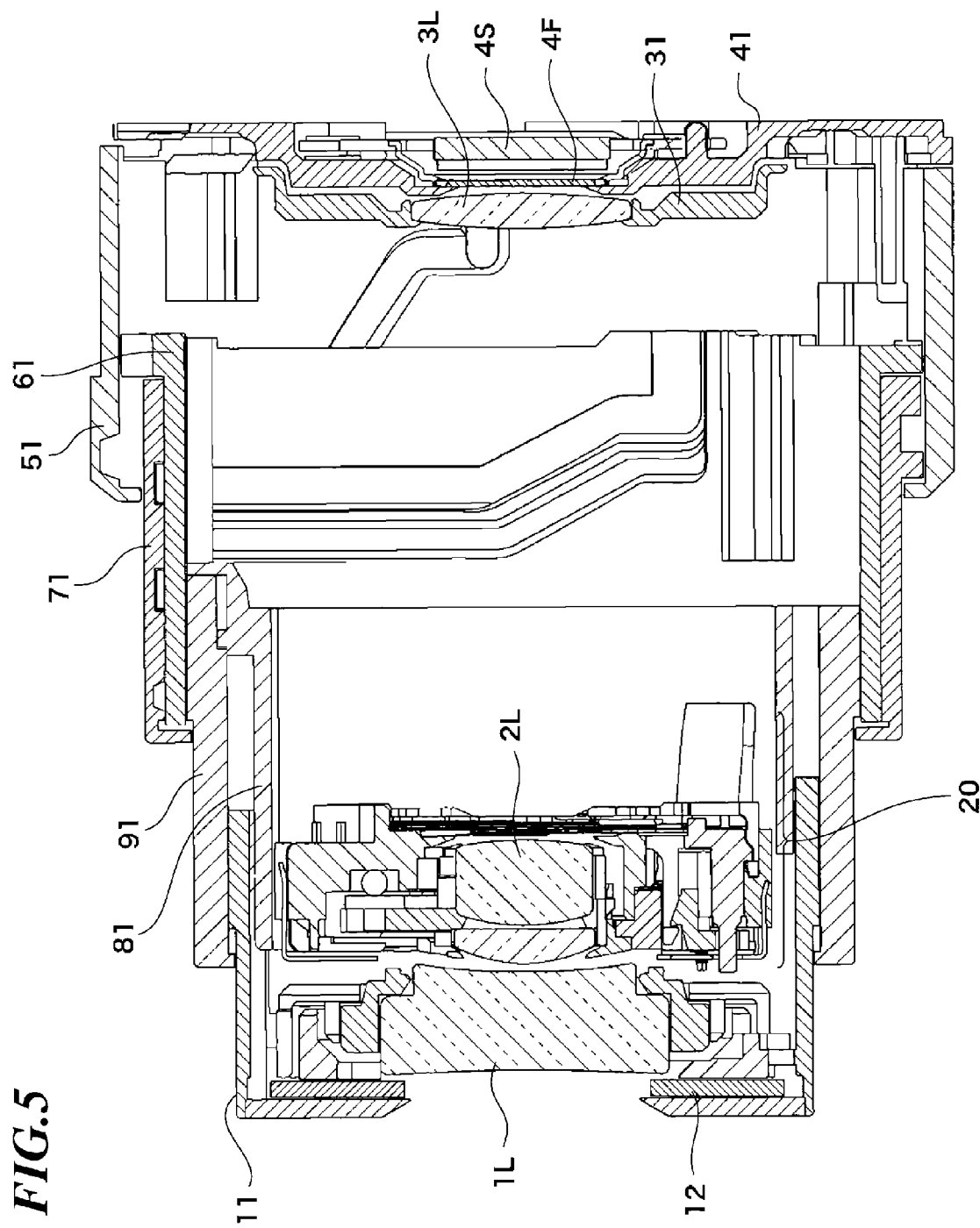
FIG. 5 is a sectional view showing the lens barrel in FIG. 2 in a stop position at a tele end.

FIG. 2 is an exploded perspective view of the lens barrel 2. FIG. 3 is a sectional view showing the lens barrel 2 in the collapsed position. FIG. 4 is a sectional view showing the lens barrel in the stop position at the wide end. FIG. 5 is a sectional view showing the lens barrel in the stop position at the tele end.

As shown in FIG. 2 through FIG. 5, the lens barrel 2 is provided with a first group unit 10 holding a first lens group 1L, a second group unit 20 holding a second lens group 2L, and a third group unit 30 holding a third lens group 3L. A filter 4F and an image pickup device 4S are held by a sensor holder 41 that constitutes a sensor holder unit 40. It should be noted that the sensor holder 41 is fixed to the camera body 1 by screws.

A guide part 51a and a cam groove 51b are formed in an inner circumferential surface of a fixed barrel 51. The guide part 51a engages with a rectilinear key 61d of a first rectilinear barrel 61 to guide the first rectilinear barrel 61 linearly in the optical axis direction. The cam groove 51b moves a drive barrel 71 in the optical axis direction with rotation of the drive barrel 71. It should be noted that the fixed barrel 51 is fixed to the sensor holder 41 by screws.

A guide part 61a that guides the first rectilinear barrel 61 linearly in the optical axis direction, and a cam groove 61b for moving a moving cam barrel 91 in the optical axis direction with rotation of the moving cam barrel 91 are formed in the inner circumferential surface of the first rectilinear barrel 61.

A cam pin 71b that engages with the cam groove 51b of the fixed barrel 51, and a gear 71a that meshes with a gear 55 of a gear unit 50 are formed in an outer circumferential surface of the drive barrel 71. The rotation of the motor 56 transfers driving force of the motor 56 to the drive barrel 71 via the gears 55 and 71a, and the drive barrel 71 moves in the optical axis direction as rotating.

An engagement groove 71c that engages with an engagement key 61c of the first rectilinear barrel 61 is formed in the inner circumferential surface of the drive barrel 71, and this engagement moves the drive barrel 71 together with the first rectilinear barrel 61 in the optical axis direction.

An engagement key 81b that engages with the guide part 61a of the first rectilinear barrel 61, a guide groove 81a that guides a cam pin 21a of the second group base plate 21 linearly in the optical axis direction, and a guide groove 81c that guides the first group barrel 11 linearly in the optical axis direction are formed in a second rectilinear barrel 81.

A cam pin 91a and a drive pin 91b are formed in an outer circumferential surface of the moving cam barrel 91. The cam pin 91a engages with the cam groove 61b of the first rectilinear barrel 61, and the drive pin 91b engages with the engagement groove 71d of the drive barrel 71. This engagement moves the moving cam barrel 91 in the optical axis direction as rotating.

A first group cam groove 91c that engages with the cam pin 11a of the first group barrel 11, and a second group cam groove 91d that engages with the cam pin 21a of the second group base plate 21 are formed in the inner circumferential surface of the moving cam barrel 91. Since the first group barrel 11 and the second group base plate 21 are guided linearly in the optical axis direction by the second rectilinear barrel 81, the first group barrel 11 and the second group base plate 21 move in the optical axis direction by the engagements between the cam grooves 91c and 91d and the cam pins 11a and 21a while being guided linearly.

The sensor holder 41 that constitutes the sensor holder unit 40 holds the gear unit 50 including the filter 4F, the image pickup device 4S, the gear 55, the motor 56, etc. The third group unit 30 holding the third lens group 3L is attached to the sensor holder 41. The third group holder 31 is guided in the optical axis direction by a guide bar 33, and is movable in the optical axis direction by driving force of a motor 32.

Figure 6:
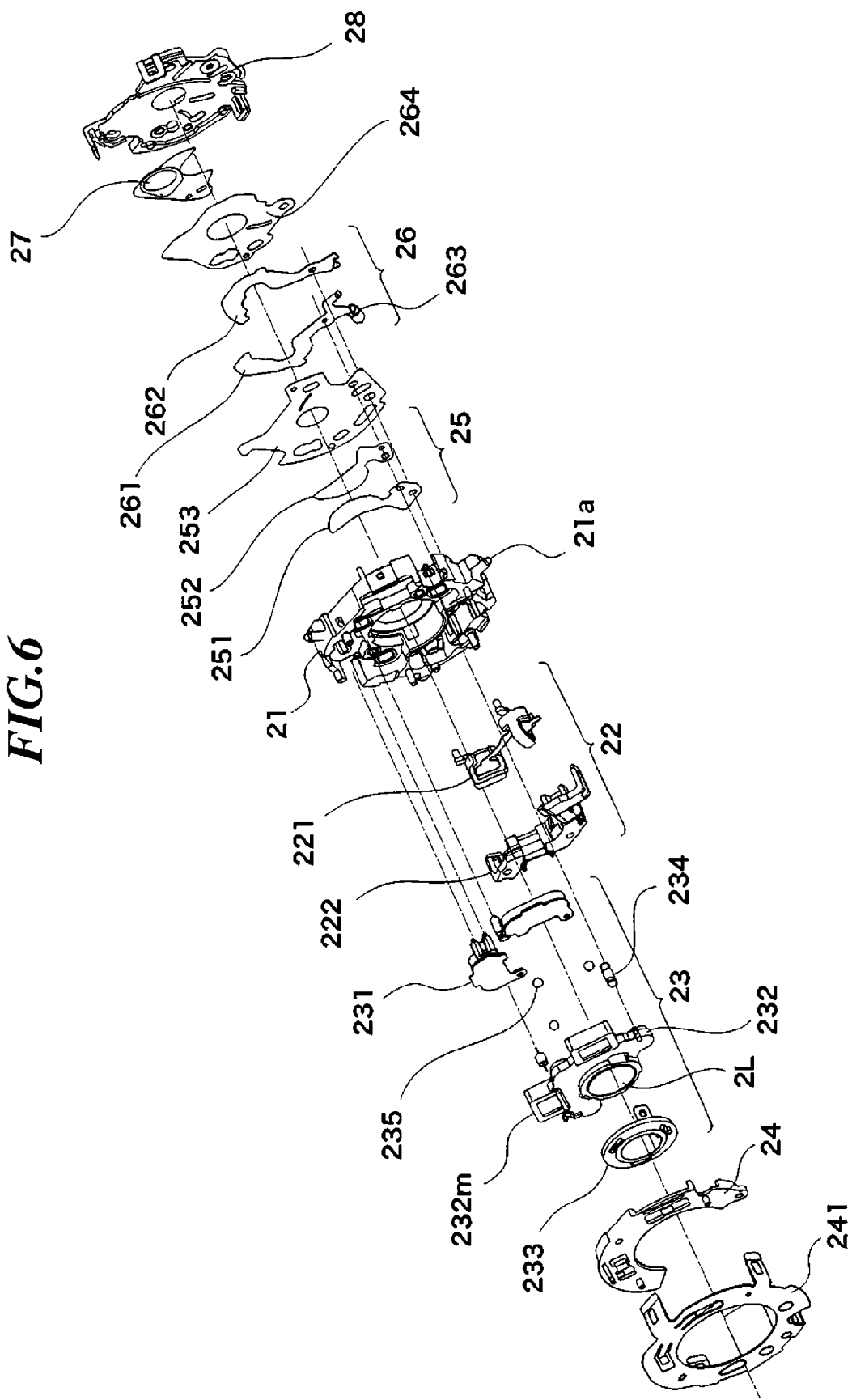
FIG. 6 is an exploded perspective view showing a second group unit that constitutes the lens barrel in FIG. 2.

Next, details of the second group unit 20 will be described with reference to FIG. 6. FIG. 6 is an exploded perspective view of the second group unit 20.

As shown in FIG. 6, the second group unit 20 is provided with the second group base plate 21, a shutter drive unit 22, an image stabilizing unit 23, a sensor holder 24, a shutter blade unit 25, a diaphragm blade unit 26, an ND blade 27, and a second group cover 28.

The second group base plate 21 is provided with the cam pin 21a that engages with the cam groove 91d formed in the moving cam barrel 91, and holds the parts of the second group unit 20.

The shutter drive unit 22 consists of a drive unit 221 and a bobbin 222. The drive unit 221 is provided with a magnet, a yoke, and a driving lever that are not shown. Then, when electric current is applied to a coil wound around the bobbin 222, the driving lever of the drive unit 221 rotates to operate the shutter blade unit 25.

The image stabilizing unit 23 is provided with a coil 231, a lens holder 232, a cover 233, an extension coil spring 234, and balls 235.

The lens holder 232 holds the second lens group 2L and a magnet 232m. The magnet 232m is arranged so as to face the coil 231 in the optical axis direction. The balls 235 are arranged between the lens holder 232 and the second group base plate 21, and the lens holder 232 is energized in the direction to approach the second group base plate 21 by the extension coil spring 234.

With the balls 235 rolling on receptacle surfaces of the lens holder 232 and the second group base plate 21, the lens holder 232 is movable in the direction perpendicular to the optical axis with respect to the second group base plate 21. Then, magnetic force yielded between the magnet 232m of the lens holder 232 and the coil 231 moves the lens holder 232 to a desired position. This functions as an image stabilizer.

The sensor holder 24 holds a sensor that detects the position of the lens holder 232. The sensor cover 241 presses the sensor holder 24 in the optical axis direction to hold it.

The shutter blade unit 25 has a pair of shutter blades 251 and 252, and a partition plate 253. The two shutter blades 251 and 252 are rotatably attached to rotating shafts provided in the second group base plate 21, and open and close in conjunction with an operation of the driving lever of the drive unit 221 of the shutter drive unit 22.

The diaphragm blade unit 26 is provided with a plurality of (two in this embodiment) diaphragm blades 261 and 262, an extension coil spring 263, and a partition plate 264. It should be note that details of the diaphragm blade unit 26 will be described below.

The ND blade 27 is arranged between the diaphragm blade unit 26 and the second group cover 28, and open and close in conjunction with an operation of the driving lever of the drive unit 221 of the shutter drive unit 22. The attachment of the second group cover 28 to the second group base plate 21 positions and holds the shutter blade unit 25, the diaphragm blade unit 26, and the ND blade 27.

Figure 7:
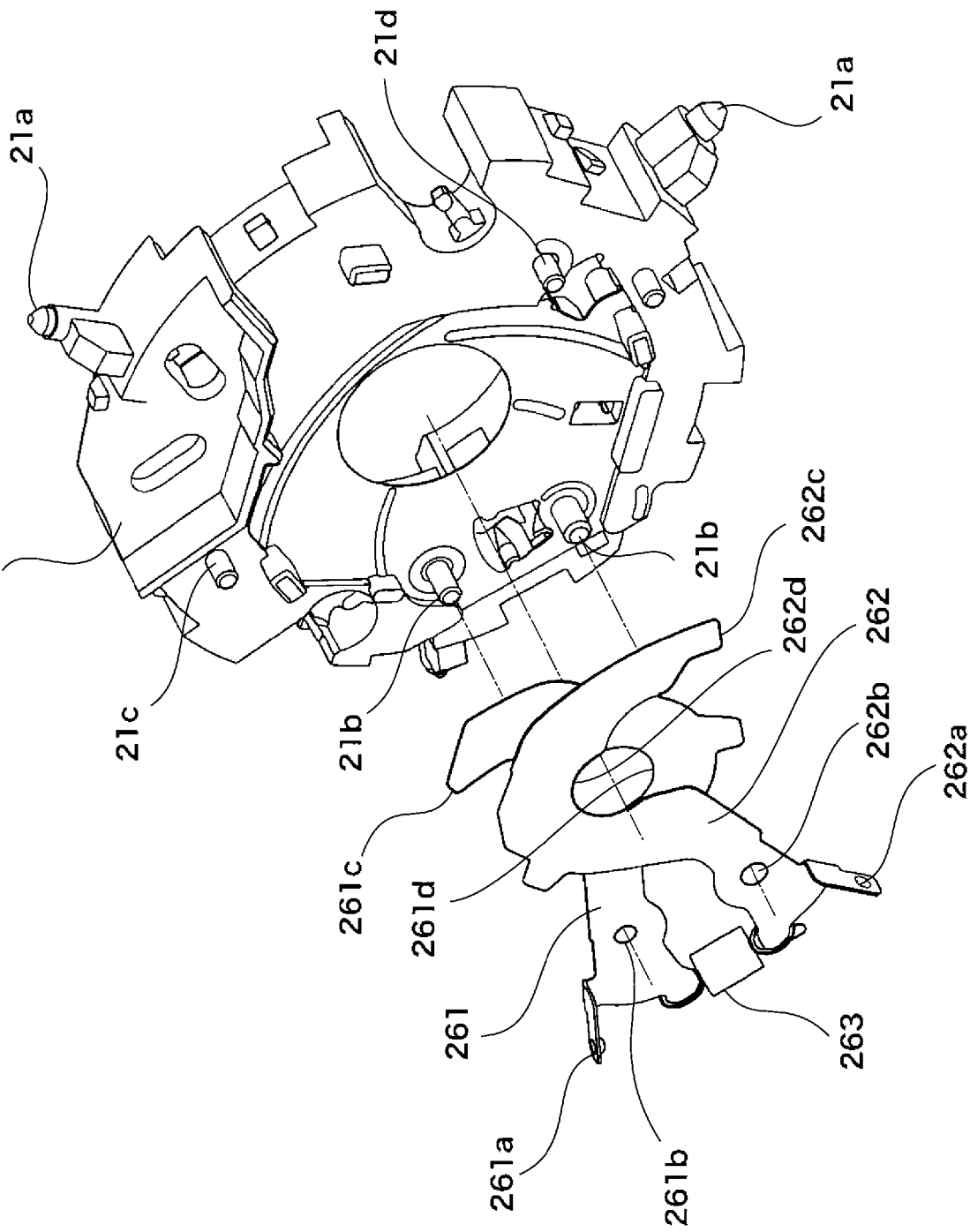
FIG. 7 is a perspective view showing a relation between a second group base plate and a diaphragm blade unit that constitute the second group unit in FIG. 6.
Figure 8:
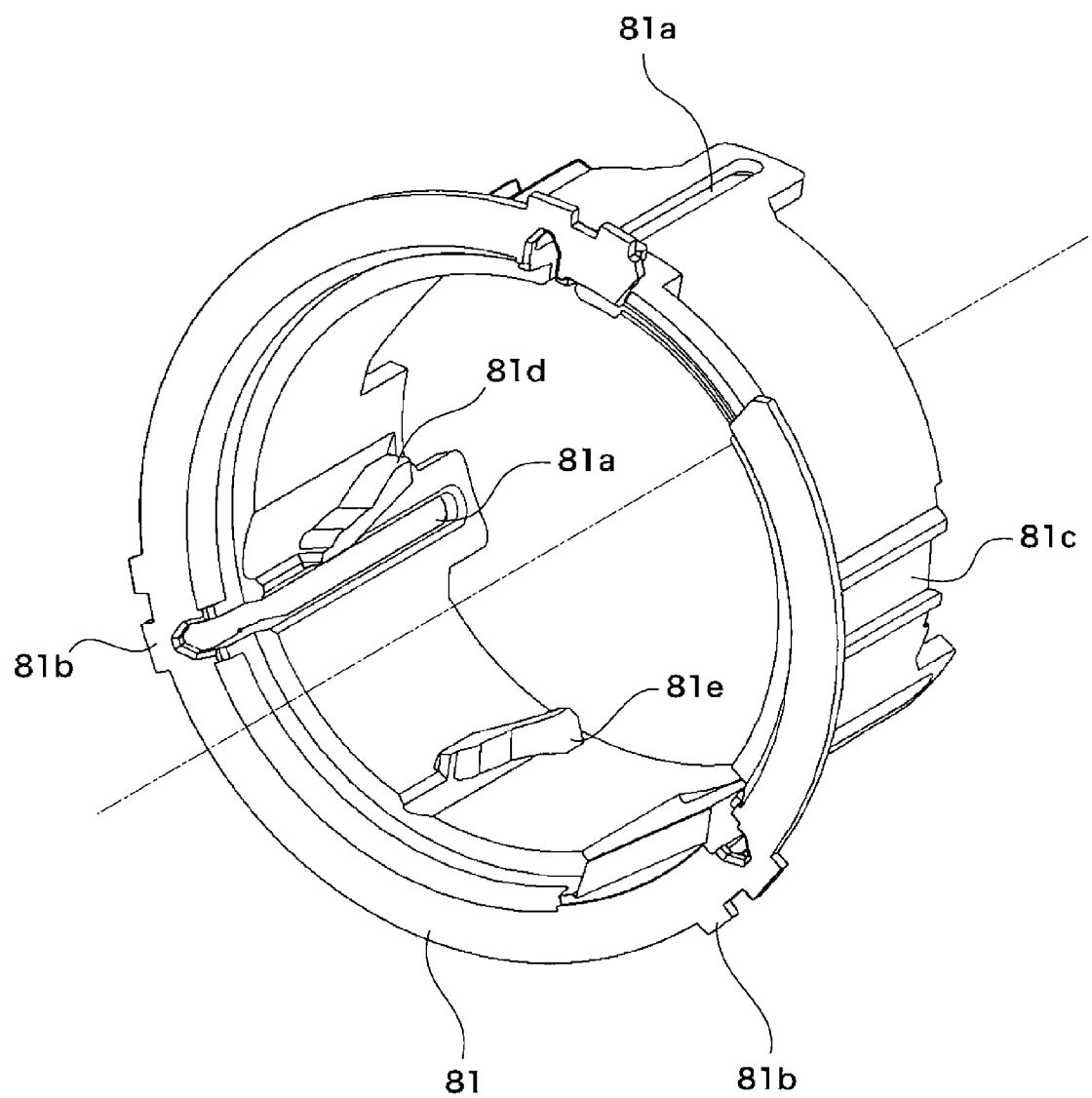
FIG. 8 is a perspective view showing a second rectilinear barrel that constitutes the lens barrel in FIG. 2 when viewed from an image surface side.

FIG. 7 is a perspective view showing a relation between the second group base plate 21 and the diaphragm blade unit 26. FIG. 8 is a perspective view showing the second rectilinear barrel 81 when viewed from an image surface side.

As shown in FIG. 7, two rotating shafts 21b of the second group base plate 21 are inserted in fitting holes 261b and 262b of the diaphragm blades 261 and 262, respectively. Accordingly, the diaphragm blades 261 and 262 are rotatably held to the second group base plate 21 so as to open and close an aperture formed by aperture parts 261d and 262d. Here, the second group base plate 21 corresponds to an example of a holding member of the present invention.

The diaphragm blades 261 and 262 have contact parts 261a and 262a that contact cam surfaces 81d and 81e (FIG. 8) of the second rectilinear barrel 81, stopper parts 261c and 262c that contact parts 21c and 21d of the second group base plate 21, and the aperture parts 261d and 262d, respectively.

The diaphragm blades 261 and 262 are energized in the direction for decreasing the aperture formed by the aperture parts 261d and 262d by the extension coil spring 263. Here, the extension coil spring 263 corresponds to an example of an energizing member of the present invention.

As shown in FIG. 8, the two cam surfaces 81d and 81e are formed in the inner circumferential surface of the second rectilinear barrel 81. Here, the contact parts 261a and 262a correspond to examples of cam engagement parts of the present invention, and the second rectilinear barrel 81 corresponds to an example of a moving member of the present invention.

Figure 9:
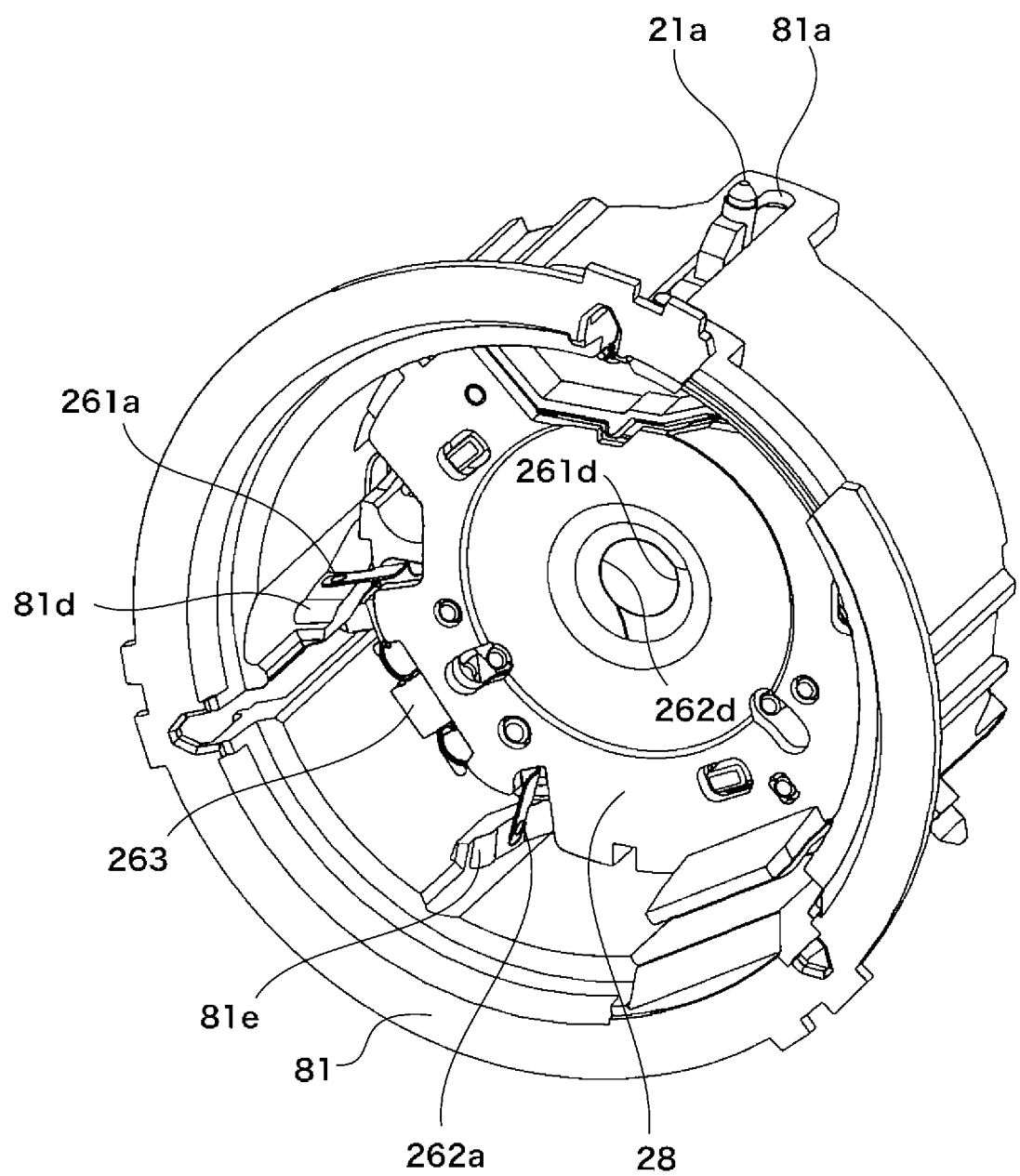
FIG. 9 is a perspective view showing a state where the second group unit in FIG. 6 is built into the second rectilinear barrel in FIG. 8 when viewed from the image surface side.

FIG. 9 is a perspective view showing the second rectilinear barrel 81 into which the second group unit 20 is built when viewed from the image surface side.

In the state in FIG. 9, the contact part 261a of the diaphragm blade 261 contacts the cam surface 81d of the second rectilinear barrel 81, and the contact part 262a of the diaphragm blade 262 contacts the cam surface 81e of the second rectilinear barrel 81. The change of the contact positions between the cam surfaces 81d and 81e and the contact parts 261a and 262a changes a shape of the aperture formed by the aperture parts 261d and 262d.

In this embodiment, the relative position of the second rectilinear barrel 81 with respect to the second group unit 20 in the optical axis direction varies with the movement of the moving cam barrel 91 in the optical axis direction due to the change of the zoom position of the lens barrel 2.

For example, as shown in FIG. 4, when the lens barrel 2 is in the step position at the wide end, the second group unit 20 moves along the second group cam groove 91d of the moving cam barrel 91, and is located in a rear end side (the image surface side) of the second rectilinear barrel 81.

As compared with this, as shown in FIG. 5, when the lens barrel 2 is in the stop position at the tele end, the second group unit 20 moves along the second group cam groove 91d of the moving cam barrel 91, and is located in a front end side (a subject side) of the second rectilinear barrel 81.

Figure 10:
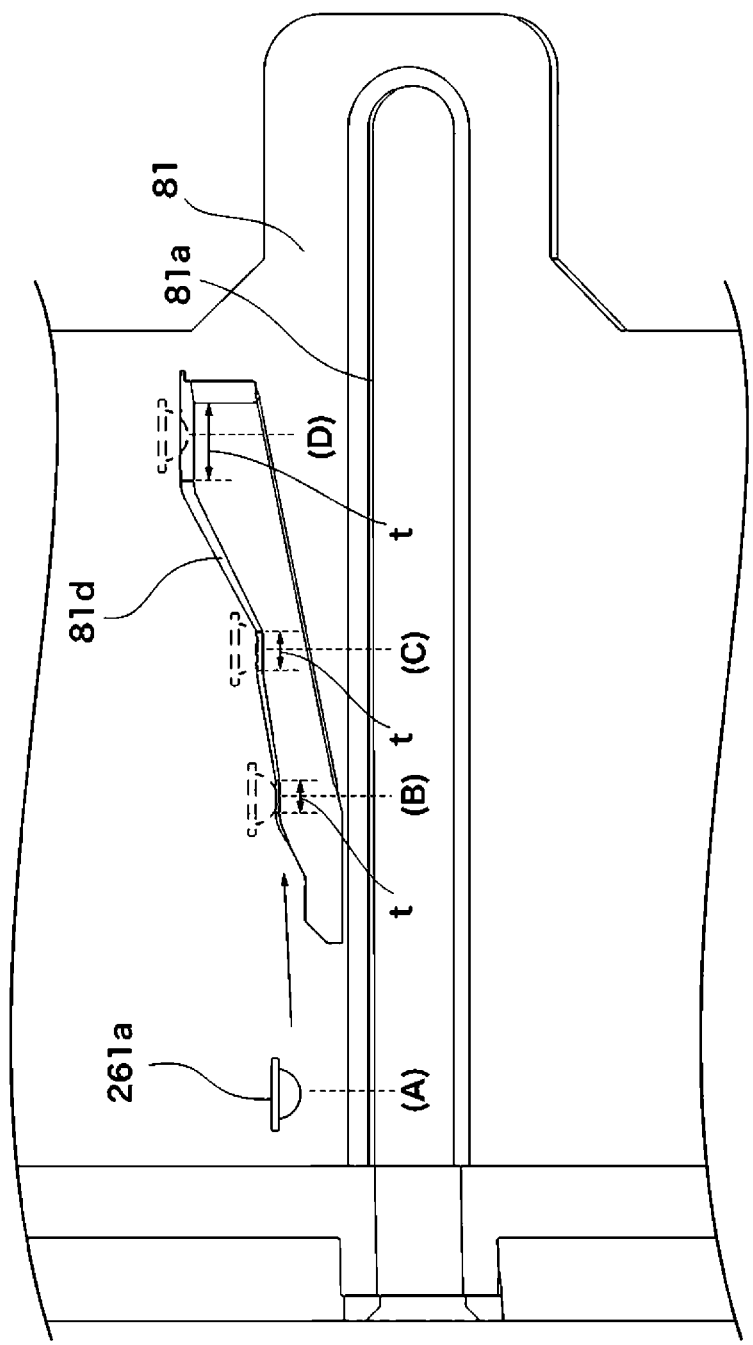
FIG. 10 is a view showing a change of a contact position between a cam surface of the second rectilinear barrel in FIG. 8 and a contact part of a diaphragm blade according to a change of a zoom position of the lens barrel.
Figure 11:
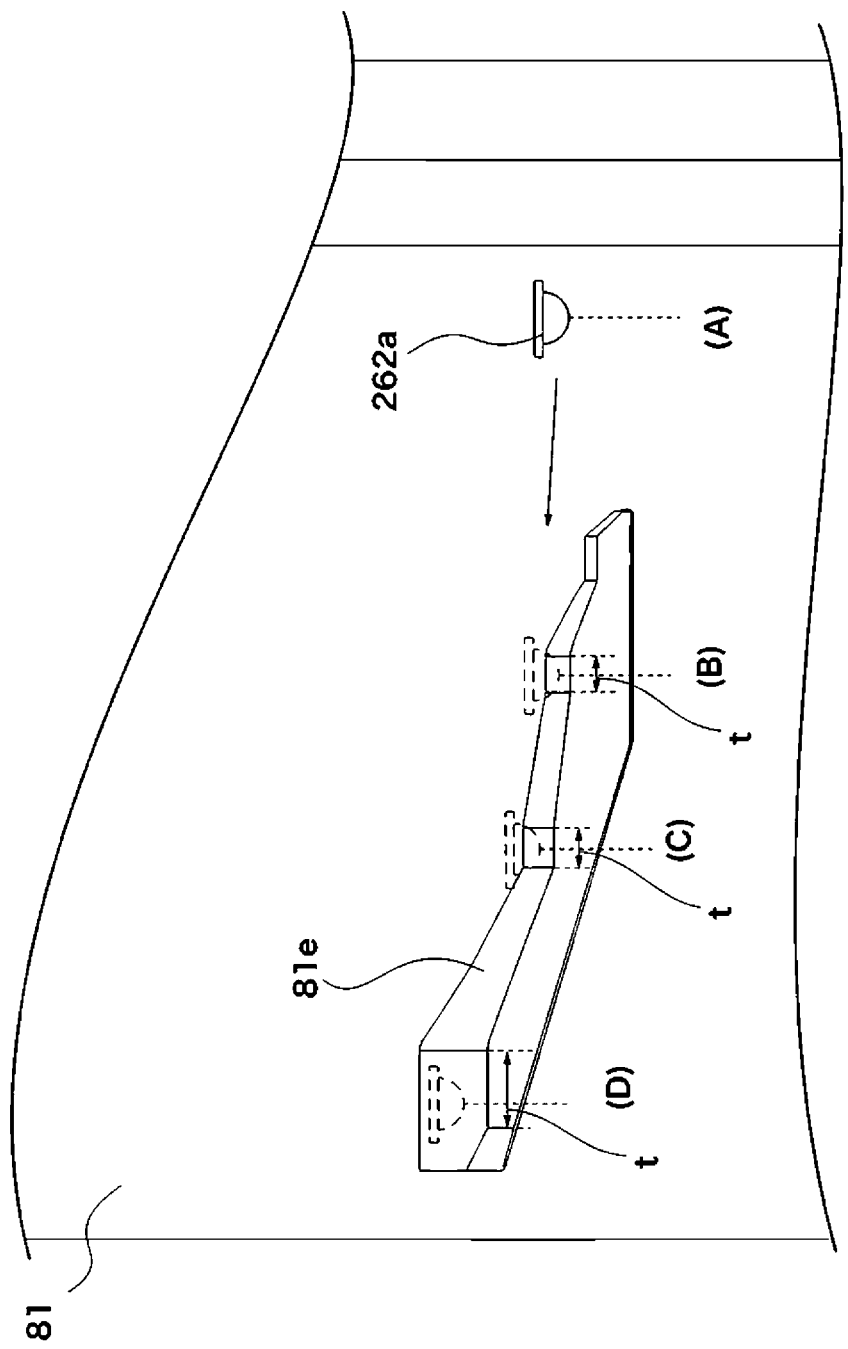
FIG. 11 is a view showing a change of a contact position between the other cam surface of the second rectilinear barrel in FIG. 8 and a contact part of the other diaphragm blade according to a change of a zoom position of the lens barrel.

FIG. 10 is a view showing a change of a contact position between the cam surface 81d of the second rectilinear barrel 81 and the contact part 261a of the diaphragm blade 261 according to the change of a zoom position of the lens barrel 2. FIG. 11 is a view showing a change of a contact position between the cam surface 81e of the second rectilinear barrel 81 and the contact part 262a of the diaphragm blade 262 according to the change of a zoom position of the lens barrel 2.

As shown in FIG. 10 and FIG. 11, when the lens barrel 2 is in the collapsed position and the stop position at the wide end, the contact parts 261a and 262a of the diaphragm blades 261 and 262 are in a position (A) in the drawings with respect to the second rectilinear barrel 81. In this state, the cam surfaces 81d and 81e do not contact the contact parts 261a and 262a.

When the lens barrel 2 moves the lens group towards the tele end from the wide end, the contact parts 261a and 262a of the diaphragm blades 261 and 262 move to positions (B), (C), (D) in order with respect to the second rectilinear barrel 81.

At this time, the contact parts 261a and 262a move along the cam surfaces 81d and 81e, and change the contact positions. The positions (B) and (C) in the drawings are stop positions in the middle range of the zoom operation, and the position (D) is the stop position at the tele end.

Here, the cam surfaces 81d and 81e are equipped with surfaces (henceforth straight sections t) parallel to the optical axis in the positions (B), (C), and (D). These straight sections t are arranged in areas of the cam surfaces 81d and 81 corresponding to the stop positions of the zooming operation of the lens barrel 2.

Therefore, even if the stop position of the zoom operation of the lens barrel 2 is slightly deviated, the positional relationship in the circumferential direction between the contact parts 261a, 262a and the second rectilinear barrel 81 is maintained unless the contact parts 261a and 262a separate from the straight sections t of the cam surfaces 81d and 81e.

Accordingly, even if the stop position of the zoom operation of the lens barrel 2 is slightly deviated, the diaphragm blades 261 and 262 do not rotate and the diameter of the aperture formed by the aperture parts 261d and 262d does not change.

Figure 12:
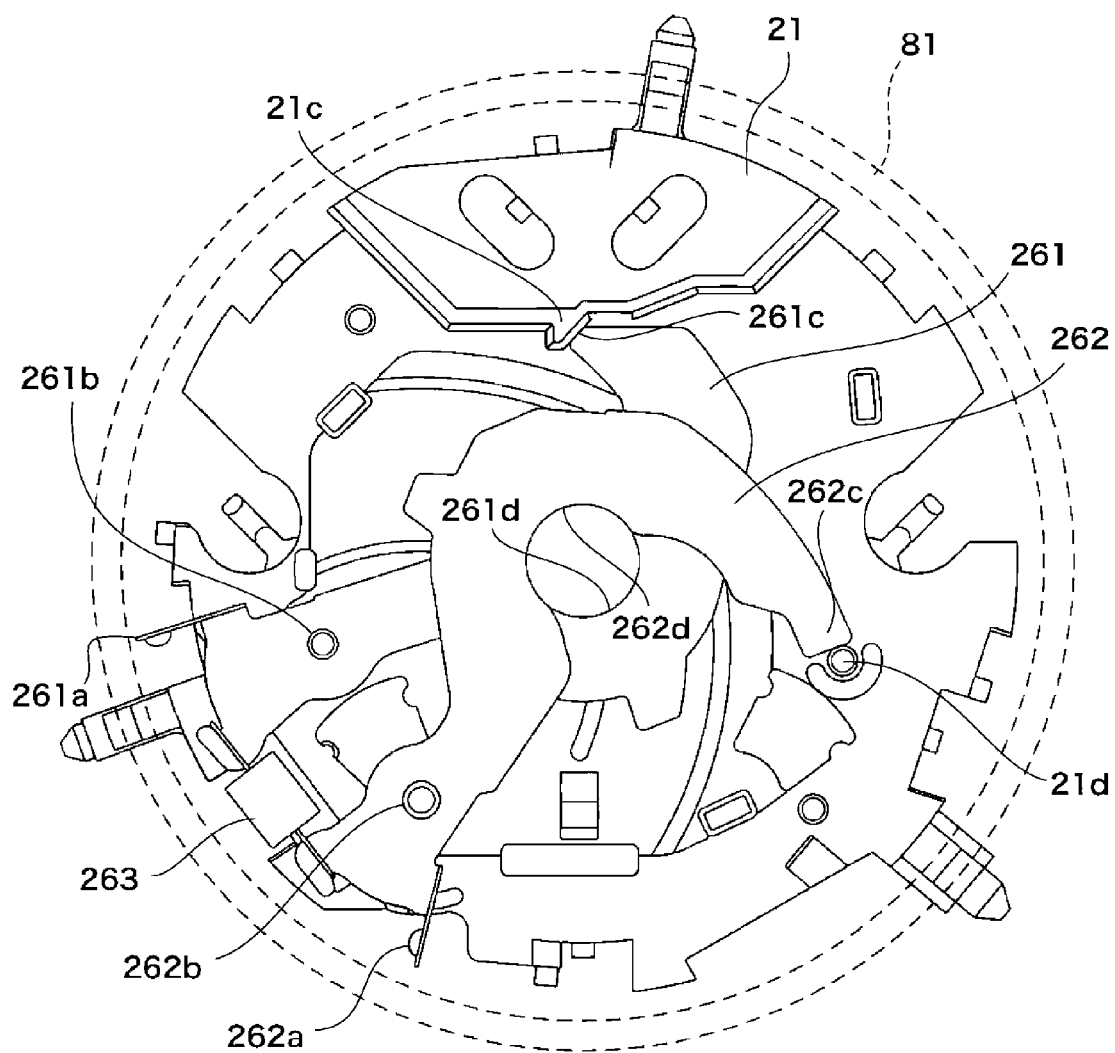
FIG. 12 is a view showing the diaphragm blades of the second group unit in FIG. 6 when viewed from the image surface side under a condition where the lens barrel in FIG. 2 is in the collapsed position or the stop position at the wide end.
Figure 13:
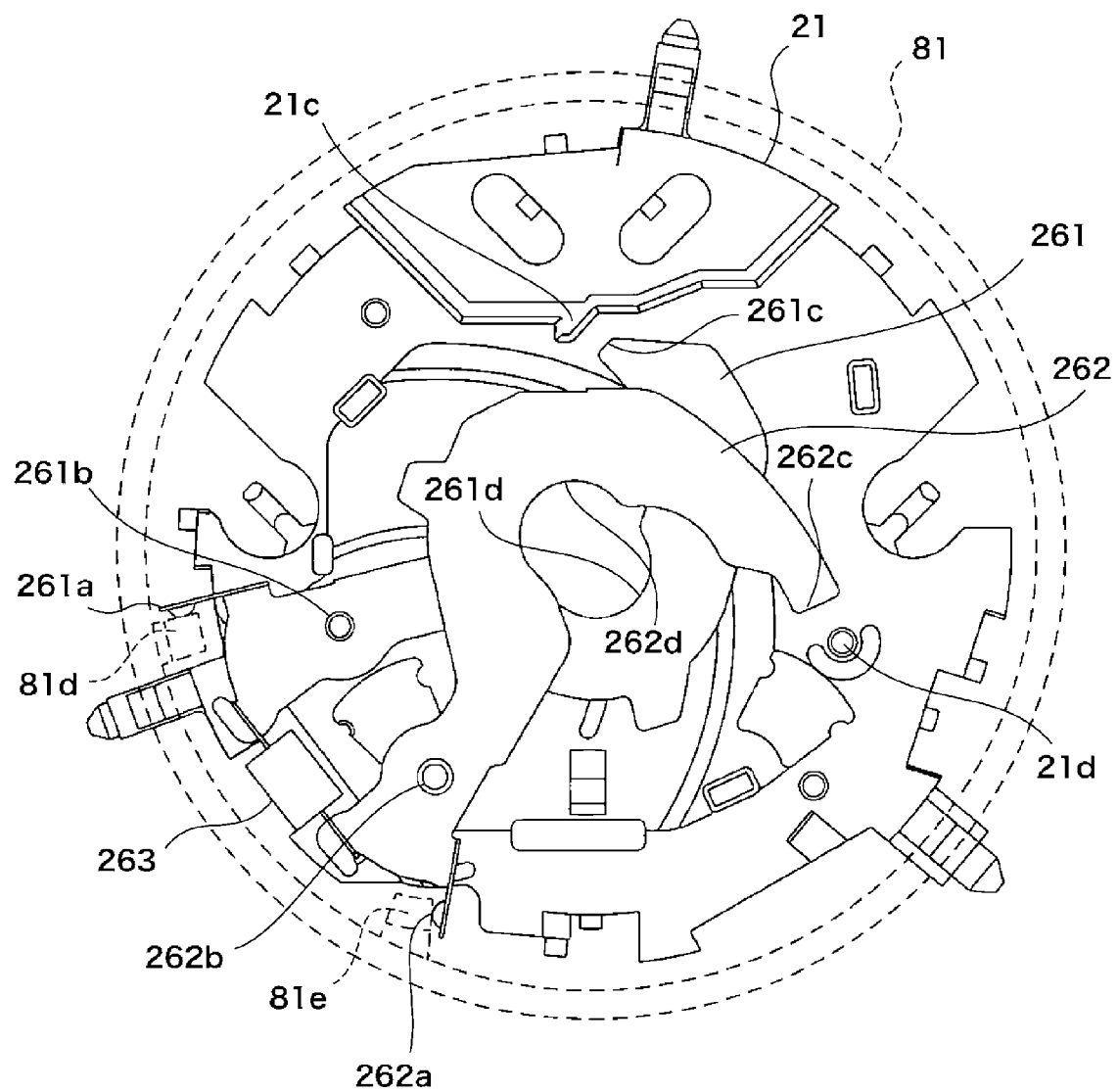
FIG. 13 is a view showing the diaphragm blades of the second group unit in FIG. 6 when viewed from the image surface side under a condition where the lens barrel in FIG. 2 is in a stop position in a middle range.
Figure 14:
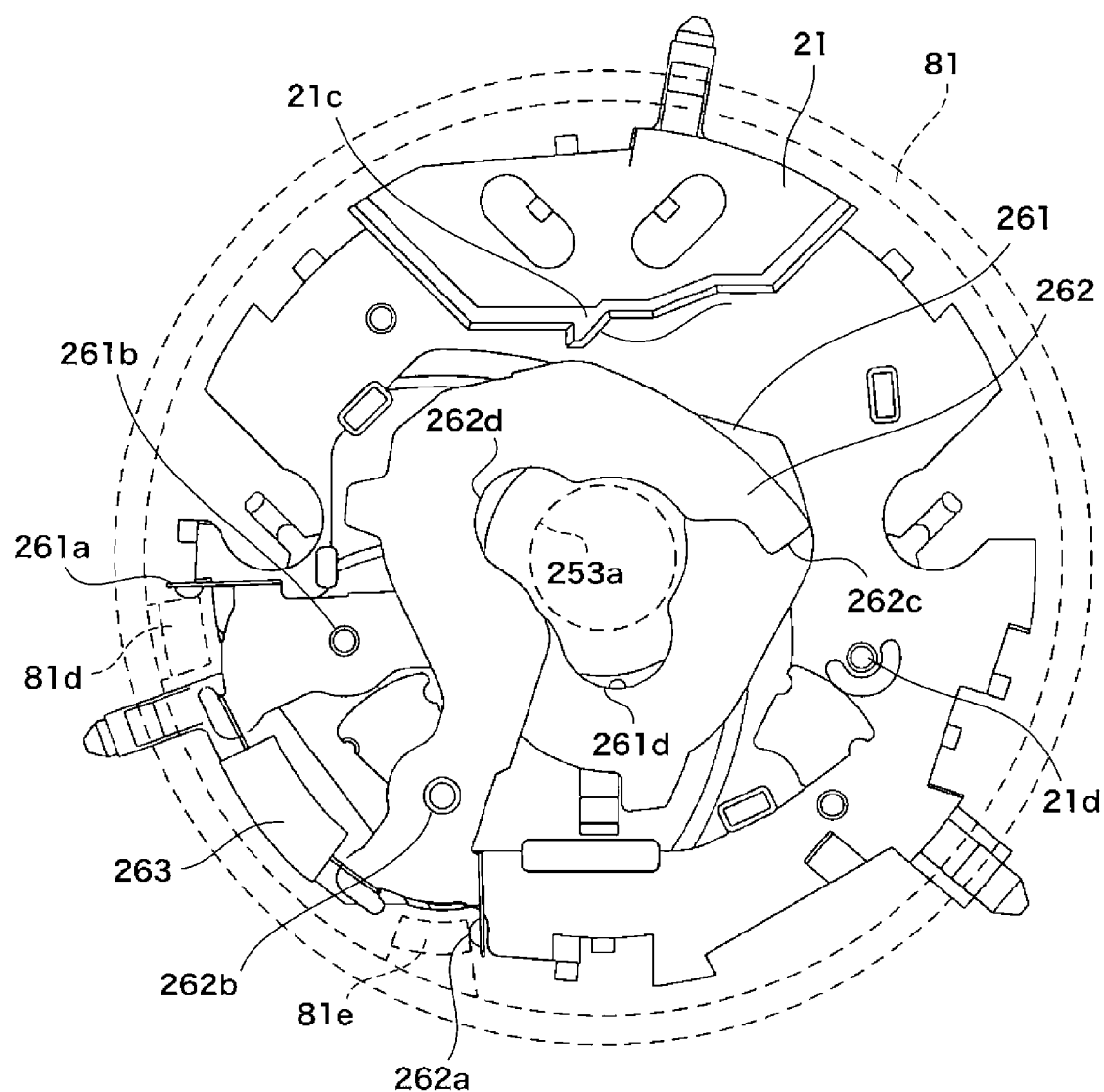
FIG. 14 is a view showing the diaphragm blades of the second group unit in FIG. 6 when viewed from the image surface side under a condition where the lens barrel in FIG. 2 is in the stop position at the tele end.

FIG. 12 through FIG. 14 are views showing the second rectilinear barrel 81 into which the second group unit 20 is built when viewed from the image surface side in the optical axis direction. It should be noted that only the second group base plate 21, the diaphragm blades 261, 262, the extension coil spring, and the second rectilinear barrel 81 are illustrated in FIG. 12 through FIG. 14 for convenience of description.

FIG. 12 is a view showing a state where the lens barrel 2 is in the collapsed position or the stop position at the wide end.

In the state in FIG. 12, the contact parts 261a and 262a of the diaphragm blades 261 and 262 are in the positions (A) in FIG. 10 and FIG. 11 with respect to the second rectilinear barrel 81, and the contact parts 261a and 262a do not contact the cam surfaces 81d and 81e.

In this time, the diaphragm blades 261 and 262 are energized in the direction for decreasing the aperture formed by the aperture parts 261d and 262d by the extension coil spring 263.

Then, the stopper part 261c of the diaphragm blade 261 contacts the contact part 21c of the second group base plate 21, and the stopper part 262c of the diaphragm blade 262 contacts the contact part 21d of the second group base plate 21. This regulates the rotating operations of the diaphragm blades 261 and 262 in the closing direction and positions them.

That is, the diaphragm blades 261 and 262 do not contact the cam surfaces 81d and 81e, but the contacts of the stopper parts 261c and 262c to the contact parts 21c and 21d of the second group base plate 21 regulate the rotating operations of the diaphragm blades 261 and 262 in the closing direction, so that the minimum aperture shape is formed.

Therefore, the accuracy of the minimum aperture shape can be determined by not the accuracy of the cam surfaces 81d and 81e but the accuracy of the contact parts 21c and 21d of the second group base plate 21 that stop the energizing force of the extension coil spring 263 via the stopper parts 261c and 262c. Accordingly, the accuracy of the minimum aperture shape can be easily ensured.

FIG. 13 is a view showing a state where the lens barrel 2 is in the stop position in the middle range.

In the state in FIG. 13, the contact parts 261a and 262a of the diaphragm blades 261 and 262 are in the positions (B) in FIG. 10 and FIG. 11 with respect to the second rectilinear barrel 81.

In this time, since the contact parts 261a and 262a contact the cam surfaces 81d and 81e, the cam action rotates the diaphragm blades 261 and 262 in an opening direction against the energizing force of the extension coil spring 263.

Then, the diaphragm blades 261 and 262 stop in the position where the stopper parts 261c and 262c separate from the contact parts 21c and 21d of the second group base plate 21, respectively, and where a predetermined aperture shape is formed.

FIG. 14 is a view showing a state where the lens barrel 2 is in the stop position at the tele end. In the state in FIG. 14, the contact parts 261a and 262a are in the positions (D) in FIG. 10 and FIG. 11 with respect to the second rectilinear barrel 81.

In this case, the diaphragm blades 261 and 262 rotate in the opening direction through the position (B) and the position (C), and arrive at the position (D) by the cam action between the contact parts 261a, 262a and the cam surfaces 81d, 81e. Then, the diaphragm blades 261 and 262 retract outside an open aperture (the aperture 253a of the partition plate 253 in this embodiment) formed in the second group unit 20.

Since the diaphragm blades 261 and 262 are retracted outside the aperture 253a in this time, they do not form the aperture shape. Therefore, since the accuracy of the aperture shape of the open aperture can be determined by not the accuracy of the cam surfaces 81d and 81e but the accuracy of the aperture 253a formed in the partition plate 253, the accuracy of the aperture shape of the open aperture can be ensured easily.

As described above, since this embodiment can change the diaphragm aperture by rotating the diaphragm blades 261 and 262 without using an actuator only for diaphragm blades, a size and cost of not only the lens barrel 2 but also the digital camera can be reduced.

This embodiment determines the accuracy of the minimum aperture shape by not the accuracy of the cam surfaces 81d and 81e but the accuracy of the contact parts 21c and 21d of the second group base plate 21 that is comparatively easy to ensure the accuracy. This can avoid the variation of the diaphragm aperture resulting from the variation in the accuracy of the cam surfaces 81d and 81e of the cam mechanism that drives the diaphragm blades 261 and 262.

It should be noted that the present invention is not limited to what has been described with the above-mentioned embodiment, quality of the material, a shape, a size, a formation, the number of elements, arrangement locations, etc., can be changed suitably unless it is deviated from the scope of the present invention.

For example, although the diaphragm blades 261 and 262 are energized in the direction for decreasing the aperture in the above-mentioned embodiment, the blades may be energized in the direction for increasing the aperture instead.

In this case, the rotating operation in the opening direction is regulated by contacting the diaphragm blades 261 and 262 to contact parts formed in the second group base plate 21 when the diaphragm blades are rotated to the open aperture position by energizing force of the energizing member.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-284794, filed on Dec. 21, 2010, which is hereby incorporated by reference herein in its entirety.

What is claimed is:

1. A lens barrel comprising:
diaphragm blades each having a cam engagement part;
a holding member that holds the diaphragm blades so as to be rotatable in directions to open and close an aperture;
an energizing member that energizes the diaphragm blades in a direction to close the aperture;
a moving member that has cam surfaces that engage the cam engagement parts of the diaphragm blades, and that moves in an optical axis direction so as to rotate the diaphragm blades in a direction to open the diaphragm blades by cam actions between the cam engagement parts and the cam surfaces against energizing force of the energizing member; and
regulation parts that regulate the operation of the diaphragm blades in the direction to close the aperture by the energizing force of the energizing member so that at a position where the aperture becomes a minimum, the cam surfaces do not engage the cam engagement parts.

2. The lens barrel according to claim 1, wherein the moving member moves in the optical axis direction in connection with a zoom operation, and the cam surfaces have surfaces that do not operate the diaphragm blades in areas corresponding to stop positions of a zoom operation of the moving member.

3. The lens barrel according to claim 2, wherein the surfaces that do not operate the diaphragm blades are parallel to an optical axis.

4. The lens barrel according to claim 1, wherein:
the diaphragm blades have a stopper part,
the holding member has a contact part,
the stopper part contacts the contact part at the position where the aperture becomes the minimum, and
the regulation parts comprises at least the stopper part and the contact part.

5. The lens barrel according to claim 1, wherein:
the diaphragm blades each have a stopper part,
the holding member has first and second contact parts,
each of the stopper parts contacts one of the first or second contact part at the position where the aperture becomes the minimum, and
the regulation parts comprises of the stopper parts and the first and second contact parts.

6. The lens barrel according to claim 1, wherein the diaphragm blades are retracted outside the aperture by the cam action between the cam engagement parts and the cam surfaces.

7. An image pickup apparatus having a lens barrel of a zoom type that moves in an optical axis direction among a collapsed position, a wide end, and a tele end to change magnification, the lens barrel comprising:
diaphragm blades each having a cam engagement part;
a holding member that holds the diaphragm blades so as to be rotatable in directions to open and close an aperture;
an energizing member that energizes the diaphragm blades in a direction to close the aperture;
a moving member that has cam surfaces that engage the cam engagement parts of the diaphragm blades, and that moves in an optical axis direction so as to rotate the diaphragm blades in a direction to open the diaphragm blades by cam actions between the cam engagement parts and the cam surfaces against energizing force of the energizing member; and regulation parts that regulate the operation of the diaphragm blades in the direction to close the aperture by the energizing force of the energizing member so that at a position where the aperture becomes a minimum, the cam surfaces do not engage the cam engagement parts.

* * * * *